Nov. 13, 1951      S. K. WOLFF      2,575,082
OUTDOOR GRILL
Filed Aug. 21, 1946      3 Sheets-Sheet 1
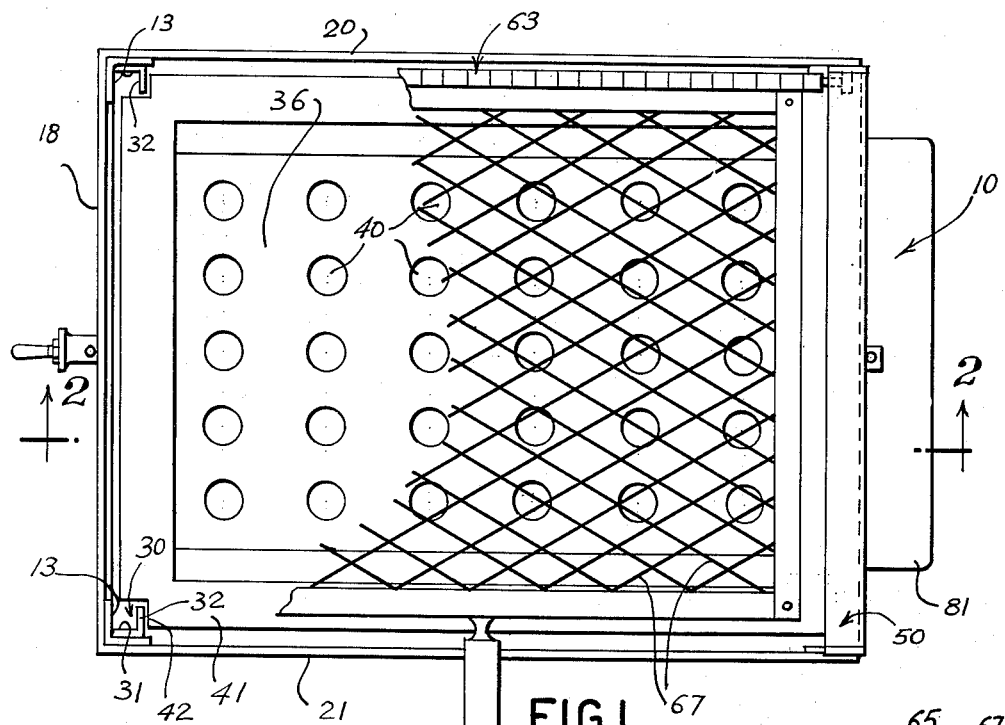
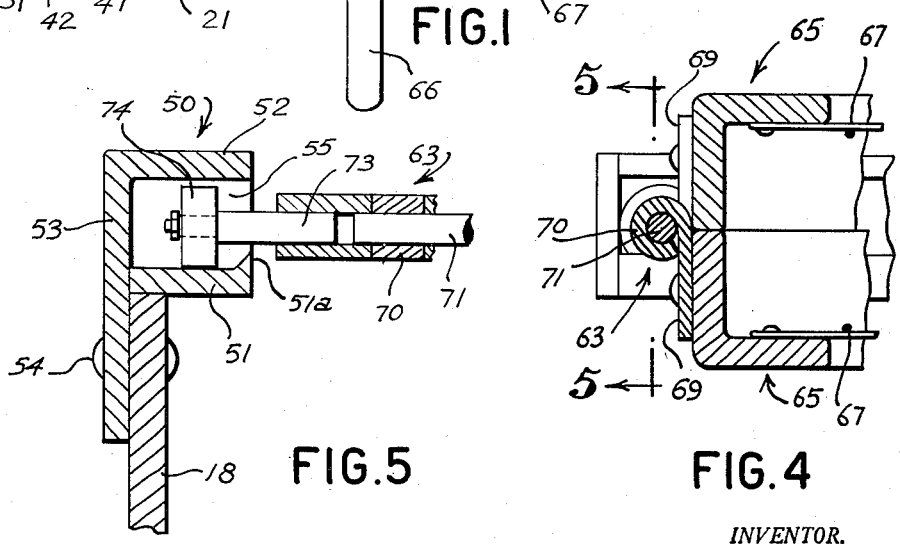 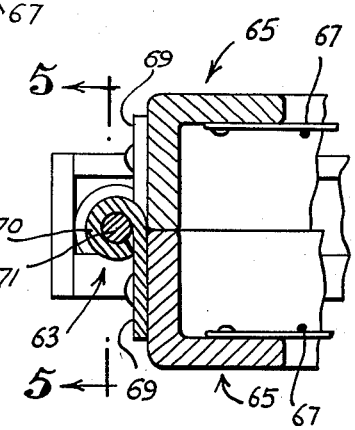
INVENTOR.
SAUL K. WOLFF
BY
J.B. Felshin
ATTORNEY Patented Nov. 13, 1951

2,575,082

UNITED STATES PATENT OFFICE 2,575,082

OUTDOOR GRILL

Saul K. Wolff, Long Beach, N. Y.

Application August 21, 1946, Serial No. 692,008

5 Claims. (Cl. 126—25)

This invention relates to outdoor grills.

An object of this invention is to provide a grill of the character described comprising a stand, a grid mounted thereon adapted to contain the food to be broiled, a fire box on the stand and beneath the grid, and means to raise or lower the fire box so as to adjust the distance of the fire box from the grid.

Another object of this invention is to provide an outdoor grill of the character described, comprising a stand provided at the top with a pair of parallel rails, a grid comprising top and bottom interpivoted frames, and means at the pivot for the frames to slidably and pivotally connect the grid to said rails, whereby after the food in the grid is broiled on one side, said grid may be swung up, then pulled from one end of the rails to the other, then turned over for broiling the opposite side of said food.

Still another object of this invention is to provide in an outdoor grill of the character described, a grid slidably and pivotally mounted on a stand, the construction being such that the grid may be readily removed from the stand to facilitate cleaning thereof.

Still a further object of this invention is to provide a strong, rugged and durable outdoor or camp grill of the character described which shall be relatively inexpensive to manufacture, attractive in appearance, easy to manipulate, and yet practical and efficient to a high degree in use.

Other objects of this invention will in part be obvious, and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a top plan view of an outdoor grill embodying the invention;

Fig. 4 is an enlarged, partial view showing a portion of the grid and the mounting thereof; and Fig. 5 is a cross-sectional view taken on line 5—5 of Fig. 4.

Figure 2:
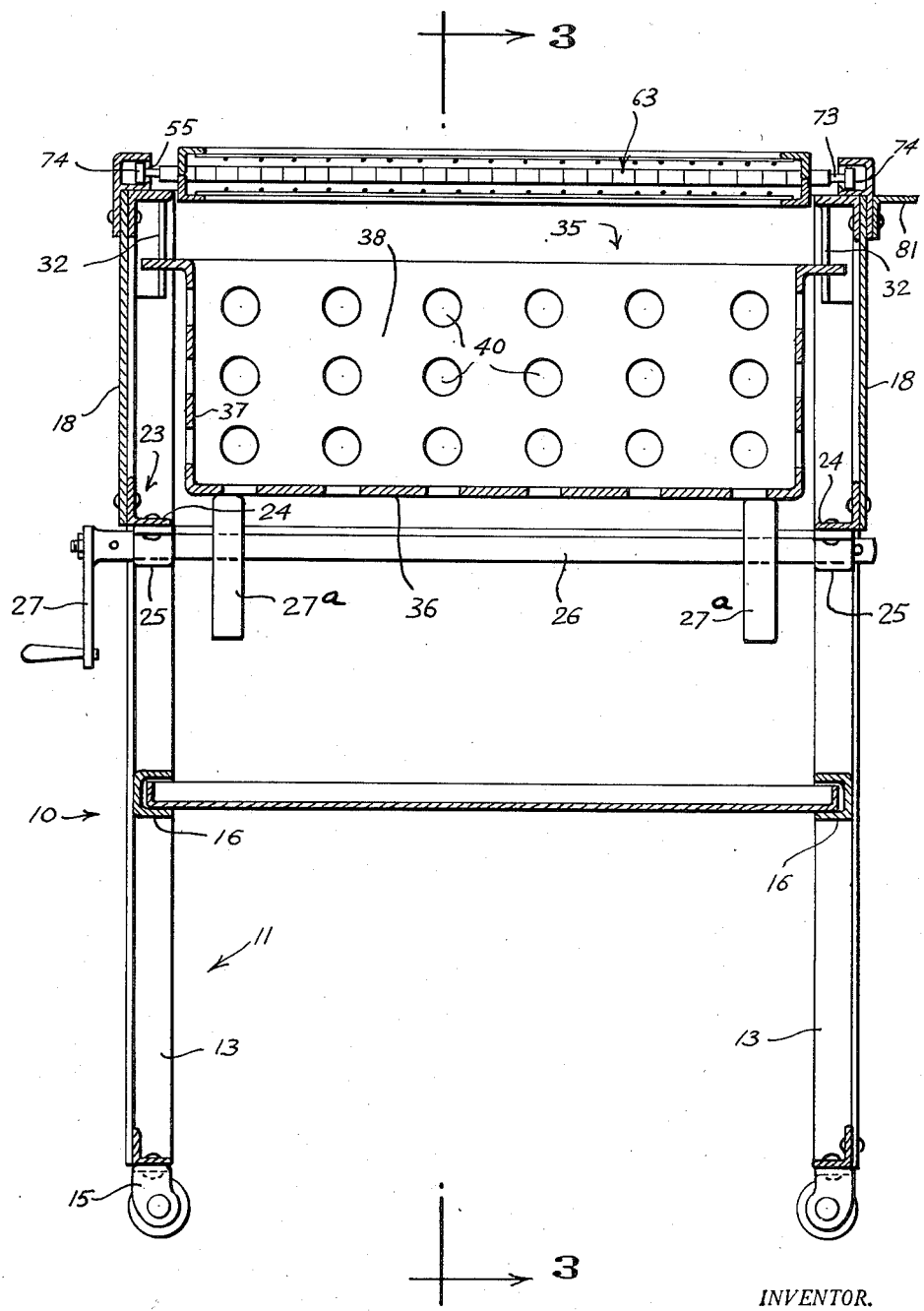
Fig. 2 is a cross-sectional view taken on line 2—2 of Fig. 1.

Referring now in detail to the drawing, 10 designates an outdoor or camp grill embodying the invention. The same comprises a stand 11 having front legs 12, and rear legs 13. Said legs may be of angular transverse cross-section. They are preferably mounted on casters 15. The front legs are connected to the rear legs by horizontal side channels 16. The rear legs 13 are interconnected by a horizontal rear channel 17 at the level of the channels 16. The front legs are connected to the rear legs by upper vertical side plates 18. The rear legs are interconnected by a rear plate 20, and the front legs are interconnected by a front plate 21. The plates 18, 20 and 21 are in alignment. Attached to the lower ends of the side plates 18 at their inner sides are parallel, horizontal angle irons 23, each formed with an inwardly extending horizontal flange 24. Attached to the underside of the middle of each flange 24 is a bearing member 25. Rotatably supported on the bearing members 25 is a horizontal shaft 26. Fixed to the front end of shaft 26 is a crank handle 27. Fixed to the shaft 26 and disposed within the stand are a pair of similar eccentric cam wheels 27a for the purpose hereinafter appearing.

Fixed to the upper ends of the vertical legs 12 and 13, at the insides thereof, are short vertical guide members 30. The guide members 30 extend substantially to the upper ends of the legs 12 and 13. Each of the guides 30 may comprise a flange 31 fixed to one of the flanges of one of the legs of the stand, and a flange 32 at right angles to the flange 31. The flanges 32 at each side of the stand are in alignment with each other and spaced from the side of the stand.

Mounted on the eccentric wheels 27a and guided by the guide walls 32 is a fire box 35. The fire box 35 comprises a horizontal bottom wall 36 and parallel side walls 37 and upwardly and outwardly inclined front and rear walls 38. The walls 36, 37 and 38 of the fire box are formed with openings 40 to permit a circulation of air through the fire box. At the upper end of the fire box are horizontal outwardly extending flanges 41. The flanges 41 are notched at their corners, as at 42, and slidably extending within said notches are the guide flanges 32.

It will now be understood that as the crank handle 27 is rotated, the fire box will be raised or lowered by the eccentric wheels 27a. The handle 27 is so arranged that when it is raised, the fire box will be raised. The fire box is guided by guide members 30 as it is adjusted vertically.

At the upper ends of the sides of the stand are parallel, horizontal, similar, symmetrical rails 50. Each rail 50 comprises a bottom wall 51, a top wall 52, and a side wall 53. The side walls 53 may be riveted as at 54 to the side walls 18 of the stand. Between walls 51, 52 and 53 of each rail is a channel 55. Walls 51 may be beaded upwardly at their inner edges as at 51a.

Figure 3:
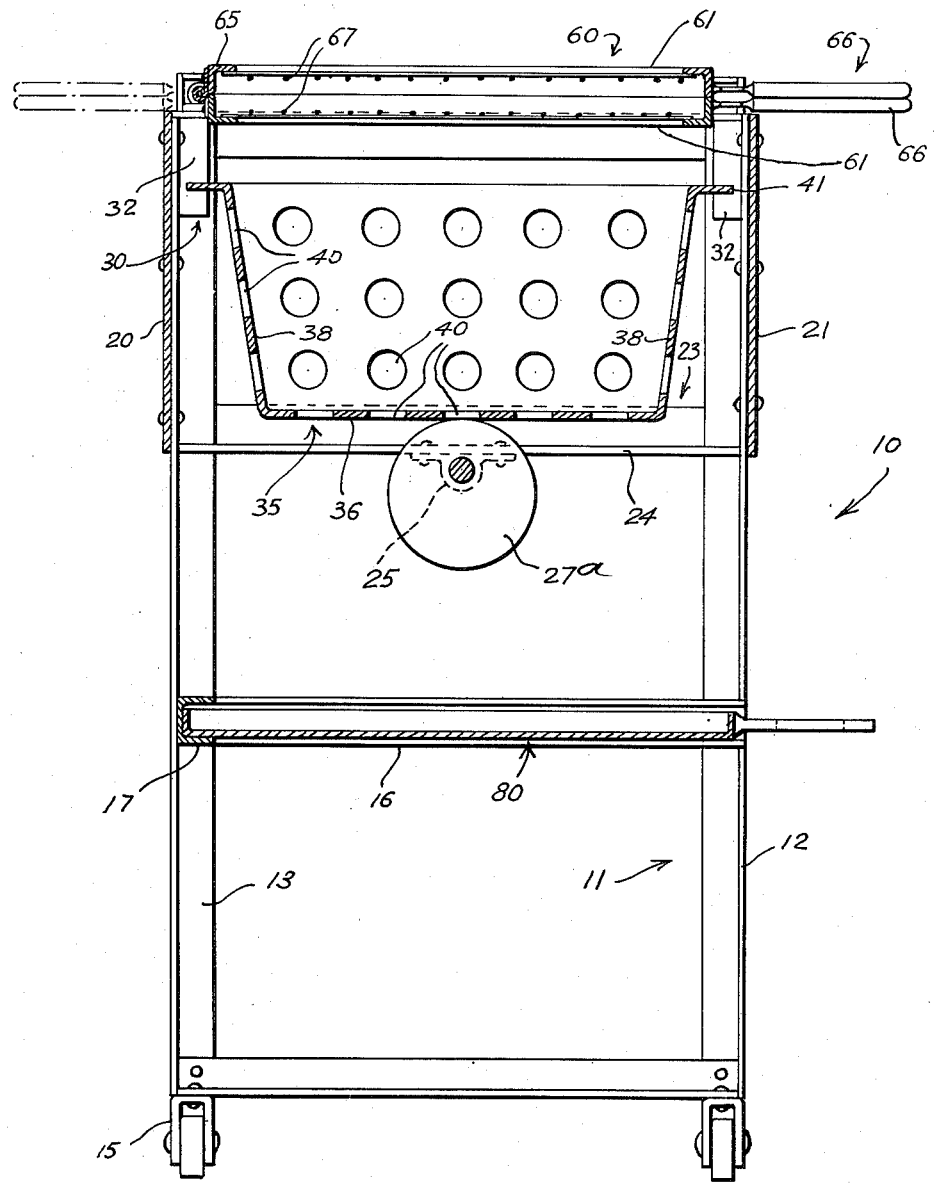
Fig. 3 is a cross-sectional view taken on line 3—3 of Fig. 2.

Mounted on top of the stand is a grid or broiler 60. Grid 60 comprises a pair of interpivoted superposed grid members 61. Said grid members 61 are similar and symmetrically disposed and are pivoted together by means of a hinge 63. Members 61 each comprise a rectangular frame 65 and a central handle 66 extending therefrom. The frame 65 is made of angle iron. Attached to each frame is a wire grill 67. Each of the frames 65 has side portions and front and rear portions. The rear portions are interpivoted by said hinge 63. The hinge 63 may comprise hinge members 69 riveted to the frame members 65. The hinge members 69 each comprise aligned, alternate tubular sections 70. The sections 70 of the frame members are in tandem and extending therethrough is a pivot or hinge rod or pin 71. Within the end tubes 70 are pins 73 which project beyond the ends of the tubes. On the pins 73 are rollers 74 received within the channels 55 of the rails. The handles 66 of the grid contact one another as shown in Fig. 3 of the drawing.

The meat or other food to be broiled is placed between the grids 67. In Fig. 3 the grid is shown in one position. When the food in the grid has been broiled sufficiently on one side, the handles may be grasped and the grid tilted slightly upwardly. The grid may then be pulled to bring the rollers 74 from the rear of the stand to the front of the stand. The grid is then rotated so that it is completely turned over, and then the opposite side of the food can be broiled. The grid may be opened in any position thereof on the stand.

While the grid or broiler 60 and the rails 50 to which the grid is slidably and pivotally connected, are shown in connection with an outdoor grill, it will be understood that such construction may be embodied in any suitable oil, gas or electric stove or range.

The grid may be easily removed for cleaning purposes. To remove the grid, one roller is held against movement and the grid is moved in such direction that the other roller moves. Such action will cause one pin 73 to slide out of end tube 70. Thereafter the grid can be pulled out of the other pin 73. The grid is thus removably mounted on the stand and it may be easily removed for the purpose of cleaning.

A removable pan 80 may be slidably mounted on the rails or channels 16 and 17 as shown in Fig. 3 of the drawing. If desired, the stand may be provided with a handle 81 at one side so that it may be moved around.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. An outdoor grill comprising a stand, a fire box slidably mounted on said stand below its upper end, means on the stand to adjust the vertical height of the fire box, said stand being provided at its upper end with a pair of parallel horizontal side rails, a grid comprising a pair of interpivoted grid members slidably and pivotally connected to said rails, whereby said grid has sliding as well as pivotal movement relative to said rails, and means to support said grid with the pivot for the grid members at one end of the rails and with one grid member at the top, and to support said grid with said pivot at the other end of the rails and with the other grid member at the top.

2. An outdoor grill comprising a stand, a pair of parallel horizontal rails extending from side to side of said stand and at the upper end of the stand, said rails having inwardly opening channels, a grid between the said rails and comprising a pair of interpivoted grid members, and means at the pivotal connection between said grid members engaging said rails whereby said grid has a sliding as well as a pivotal connection to said stand, and means to support the grid in horizontal position above the stand with the pivotal connection at one side of the stand and one grid member at the top, and to support said grid member in horizontal position above the stand with the pivotal connection at the other side of the stand, and with the other grid member at the top.

3. An outdoor grill comprising a stand having four corner legs, means to interconnect said legs, a vertical guide adjacent each leg, a fire box within the stand and having means to engage said guide means, a pair of aligned bearings on said stand, a shaft rotatably mounted on said bearings, a pair of eccentric wheels on said shaft, said fire box resting on said eccentric wheels, a crank handle on said shaft and disposed beyond one side of said stand for rotating said shaft, and a grid slidably and rotatably mounted on said stand and above said fire box.

4. An outdoor grill comprising a stand, a pair of parallel, horizontal, symmetrical, inwardly opening channel rails at the upper end of said stand and extending from side to side thereof, a grid comprising a pair of grid frames, hinge means to interpivot said frames, said hinge means including tubes, pins in said tubes, and rollers on said pins engaging in said channels whereby to pivotally and slidably connect said grid to said stand and means to support said grid in horizontal position at the top of the stand and between said rails with said hinge means at one end of the rails and one grid frame at the top, and with said hinge means at the other end of said rails, and with the other grid frame at the top.

5. A stove comprising a pair of parallel, horizontal, symmetrical, inwardly opening channel rails, means to support said rails, a grid comprising a pair of grid frames, hinge means to interpivot said frames, rollers on said hinge, and means engaging in said channels whereby to pivotally and slidably connect said grid to said rails, and means to support said grid in horizontal position with said hinge means at one end of said rails and one grid frame at the top, and to support said grid in horizontal position with the hinge means at the other end of the rails, and with the other grid frame at the top.

SAUL K. WOLFF.

REFERENCES CITED

The following references are of record in the file of this patent:

UNITED STATES PATENTS

| Number | Name | Date |
|---|---|---|
| 44,844 | Allyn | Nov. 1, 1864 |
| 268,706 | Miller | Dec. 5, 1882 |
| 326,328 | Pillault | Sept. 15, 1885 |
| 915,262 | Bailey et al. | Mar. 16, 1909 |
| 956,064 | Fish et al. | Apr. 26, 1910 |
| 982,771 | Shields | Jan. 24, 1911 |
| 1,540,434 | Stone | June 2, 1925 |
| 1,772,171 | Wells | Aug. 5, 1930 |
| 1,796,033 | Lee | Mar. 10, 1931 |
| 2,033,898 | Krebs | Mar. 10, 1936 |
| 2,058,172 | Myers | Oct. 20, 1936 |
| 2,114,697 | Babin | Apr. 19, 1938 |
| 2,122,275 | Bitney | June 28, 1938 |
| 2,168,944 | Polhemus | Aug. 8, 1939 |
| 2,325,828 | Betts | Aug. 3, 1943 |
| 2,334,847 | Spiers | Nov. 23, 1943 |
| 2,460,125 | Carroll | Jan. 25, 1949 |

FOREIGN PATENTS

| Number | Country | Date |
|---|---|---|
| 370,105 | Germany | May 21, 1921 |